United States Patent [19]

Mizuhara

[11] Patent Number: 4,883,745

[45] Date of Patent: Nov. 28, 1989

[54] SILVER-COPPER-TITANIUM BRAZING ALLOY CONTAINING CRUST INHIBITING ELEMENT

[75] Inventor: Howard Mizuhara, Hillsborough, Calif.

[73] Assignee: GTE Products Corporation, Stamford, Conn.

[21] Appl. No.: 268,142

[22] Filed: Nov. 7, 1988

[51] Int. Cl.$^4$ ............................................. C22C 5/08
[52] U.S. Cl. ............................... 420/502; 228/263.18; 428/606
[58] Field of Search ................... 420/502; 228/263.18; 428/606

[56] References Cited

U.S. PATENT DOCUMENTS 3,455,663  7/1969  Zdanuk ............................... 420/502
4,623,513  11/1986  Mizuhara ........................... 420/502

FOREIGN PATENT DOCUMENTS 244092  5/1969  U.S.S.R. ............................... 420/502

Primary Examiner—Robert McDowell
Attorney, Agent, or Firm—James Theodosopoulos

[57] ABSTRACT

A silver-copper-titanium brazing alloy contains a small amount of tin, indium, silicon, aluminum or manganese as a crust inhibiting element.

7 Claims, No Drawings

SILVER-COPPER-TITANIUM BRAZING ALLOY CONTAINING CRUST INHIBITING ELEMENT

This invention concerns copper-silver brazing alloys containing titanium as an active metal for brazing, for example, to ceramics. Such brazing alloys are disclosed in U.S. Pat. Nos. 4,766,041, 4,735,866, 4,698,271, 4,684,579, 4,643,875, 4,623,513, 4,591,535, 4,448,853, 3,455,663; in U.K. Pat. Nos. 2,167,989, 1,270,477, 932,729; in Canada Pat. No. 559,434; in European Pat. No. 0,038,584; in Auslegeschrift 1,030, 756; in France Pat. No. 1,174,330. When these brazing alloys are melted on a ceramic surface and cooled to room temperature, the alloy surface is a bright metallic color. However, when melted on metals such as stainless steel, Kovar (Westinghouse trademark for an Fe-Ni-Co alloy), cupronickel or 42Ni—58Fe alloy and cooled to room temperature, the surface is dull and a crusty oxidized layer is found on the surface. Such a crusty layer can compromise the quality of the brazed joint when a ceramic is brazed to a metal.

I have found that the addition of a small amount of tin, indium, silicon, aluminum or manganese to the silver-copper-titanium brazing alloy can eliminate the surface crust formation.

A brazing alloy in accordance with this invention has a composition consisting essentially of titanium in an amount of 0.5 to 5 weight percent, silver in an amount of 55 to 73 weight percent, from 0.1 to less than about 2 weight percent of an element which inhibits crust formation of the brazing alloy when the brazing alloy is melted on metal and cooled, the balance of the composition being copper. The crust eliminating element can be one or more of Sn, In, Si, Al, or Mn.

In the following examples, all compositions are in weight percent.

EXAMPLE 1

An Alloy B with a composition of 71% silver, 1.5% titanium, 0.5% tin, 27% copper was melted on a water cooled copper skull melter using tungsten electrode under argon atmosphere. The button was rolled down to 2 mil thickness foil. An assembly consisting of $\frac{3}{8}''$ diameter by $\frac{1}{4}''$ long alumina cylinder was placed on $1'' \times 1'' \times 10$ mil thickness Kovar sheet with above foil between. The assembly was brazed at 820° C. under $10^{-5}$ torr vacuum. The brazed assembly showed fillet around the ceramic base and the surface of the metal had a bright metallic finish. The seal was hermetic to helium mass spectrograph.

EXAMPLE 2

As a control, an Alloy O with a composition 71% silver, 1.5% titanium, 27.5% copper was prepared and tested as in EXAMPLE 1. The result of the braze test showed limited fillet and crusty looking finish. The seal was tested with He mass spectrograph and showed an unacceptable leak rate of $10^{-7}$ cc. per sec. (acceptable is $10^{-9}$ cc. per sec). This alloy did not contain a crust eliminating element.

EXAMPLE 3

An Alloy F with a composition of 63% silver, 1.5% titanium, 0.5% tin, 35% copper was prepared and tested as in EXAMPLE 1.

The result showed that this alloy was crust free over Kovar, and formed a full smooth fillet between the alumina cylinder and Kovar substrate.

EXAMPLE 4

An Alloy K with a composition of 63% silver, 1.5% Ti, 1% In, 34.5% Cu was prepared and tested as in EXAMPLE 1.

The result of the braze test was similar to EXAMPLE 3.

EXAMPLE 5

An Alloy M with a composition of 65% Ag, 1.5% Ti, 1% Si, 32.5% Cu was prepared and brazed as in Example 1 and resulted in a smooth metallic braze alloy with excellent fillet between ceramic cylinder and Kovar substrate.

EXAMPLE 6

A powder consisting of Composition F, 63% Ag, 1.5% Ti, 0.5% Sn, 35% Cu was made into a screenable paste with a screening oil. Using 105 mesh screen, an alumina substrate was screened, dried and heated to 820° C. under $10^{-5}$ torr vacuum. An excellent bond resulted.

EXAMPLE 7

A button with a Composition K, 63% Ag, 1.5% Ti, 1% In, 34.5% Cu was drawn down to 40 mil diameter wire. The wire was made into a circular shape preform and placed at a base of $\frac{1}{4}''$ diameter by $\frac{1}{4}''$ long type 410 stainless steel and placed on alumina substrate. The assembly was brazed at 820° C. for 10 minutes under $10^{-5}$ torr vacuum. An excellent joint resulted.

EXAMPLE 8

A button with Composition P, 63% silver, 1.5% titanium, 0.5% aluminum, 35% copper was prepared and brazed as in Example 1 and resulted in smooth metallic finish with fillet between ceramic cylinder and Kovar substrate.

EXAMPLE 9

A button with Composition Q, 63% silver, 1.5% titanium, 0.5% manganese, 35% copper was prepared and brazed as in Example 1 and resulted in smooth metallic finish with fillet between ceramic cylinder and Kovar substrate.

The following table shows compositions, liquidus and solids temperatures for examples within this invention (except for Samples L, N and O). Samples L, N and O did not contain crust eliminating elements as per this invention and did not yield crust free results.

TABLE 1

| Sample | Composition | | | | Liq. °C. | Sol- °C. |
|---|---|---|---|---|---|---|
| A | 71 Ag | 0.75 Ti | 0.5 Sn | 27.75 Cu | 807 | 778 |
| B | 71 Ag | 1.50 Ti | 0.5 Sn | 27.0 Cu | 813 | 776 |
| C | 67 Ag | 1.5 Ti | 0.5 Sn | 31.75 Cu | 788 | 774 |
| D | 67 Ag | 1.5 Ti | 0.5 Sn | 31.0 Cu | 795 | 772 |
| E | 63 Ag | 0.75 Ti | 0.5 Sn | 35.75 Cu | 813 | 770 |
| F | 63 Ag | 1.5 Ti | 0.5 Sn | 35.0 Cu | 811 | 770 |
| G | 63 Ag | 1.5 Ti | 0.25 Sn | 35.25 Cu | 813 | 774 |
| H | 63 Ag | 1.5 Ti | 1.0 Sn | 34.5 Cu | 806 | 770 |
| I | 59 Ag | 0.75 Ti | 0.5 Sn | 39.75 Cu | 840 | 774 |
| J | 59 Ag | 1.5 Ti | 0.5 Sn | 39.0 Cu | 826 | 773 |
| K | 63 Ag | 1.5 Ti | 1 In | 34.5 Cu | 809 | 765 |
| L | 63 Ag | 1.5 Ti | 1 Ge | 34.5 Cu | 796 | 780 |
| M | 65 Ag | 1.5 Ti | 1 Si | 32.5 Cu | 805 | 786 |
| N | 63 Ag | 1.5 Ti | | 35.5 Cu | 815 | 780 |
| O | 71 Ag | 1.5 Ti | | 27.5 Cu | 810 | 780 |

TABLE 1-continued

| Sample | Composition | | | | | Liq. °C. | Sol- °C. |
|---|---|---|---|---|---|---|---|
| P | 63 Ag | 1.5 Ti | 0.5 Al | | 35 Cu | 823 | 779 |
| Q | 63 Ag | 1.5 Ti | 0.5 Mn | | 35 Cu | 816 | 779 |

Composition N, in a 2 mil thick foil, was used to braze a Kovar cap to an alumina cylinder. An oxide layer impeded fillet flow and the joint had an unacceptable leak rate. However, Composition F, in a 2 mil thick foil in the sam e braze test, produced a full fillet and an acceptable leak rate. Composition F was substantially indentical to composition N, but with 0.5% Sn added.

I claim:

1. A brazing alloy having a composition consisting essentially of titanium in an amount of 0.5 to 5 weight percent, silver in an amount of 55 to 73 weight percent, from 0.1 to less than 2 weight percent of at least one crust eliminating element, selected from the group consisting of tin, indium, silicon, aluminum and manganese which inhibits crust formation of the brazing alloy when the brazing alloy is melted and cooled, the balance of the composition being copper.

2. The brazing alloy of claim 1 having a composition of, in weight percent, 71 Ag, 1.5 Ti, 0.5 Sn, 27 Cu.

3. The brazing alloy of claim 1 having a composition of, in weight percent, 63 Ag, 1.5 Ti, 0.5 Sn, 35 Cu.

4. The brazing alloy of claim 1 having a composition of, in weight percent, 63 Ag, 1.5 Ti, 1.0 In, 34.5 Cu.

5. The brazing alloy of claim 1 having a composition of, in weight percent, 65 Ag, 1.5 Ti, 1 Si, 32.5 Cu.

6. The brazing alloy of claim 1 having a composition of, in weight percent, 63 Ag, 1.5 Ti, 0% 0.55 Al, 35 Cu.

7. The brazing alloy of claim 1 having a composition of, in weight percent, 63 Ag, 1.5 Ti, 0.5 Mn, 35 Cu.

* * * * *